Patented Sept. 24, 1940

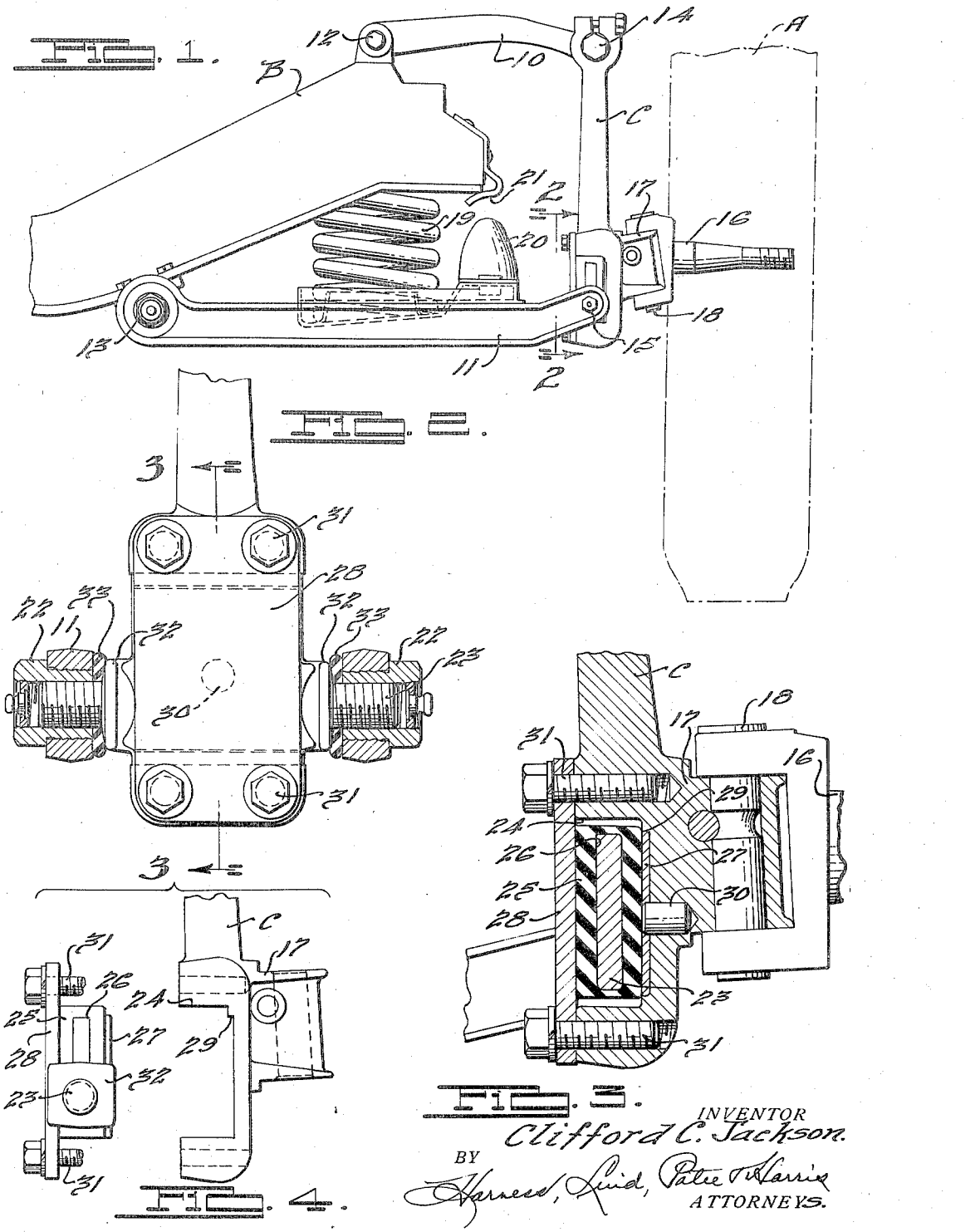

2,215,703

UNITED STATES PATENT OFFICE 2,215,703

WHEEL SUSPENSION

Clifford C. Jackson, Highland Park, Mich., assignor to Chrysler Corporation, Highland Park, Mich., a corporation of Michigan Application April 17, 1939, Serial No. 268,225

9 Claims. (Cl. 267—20)

This invention relates to motor vehicles and refers more particularly to improvements in suspensions for ground wheels of motor vehicles.

It is an object of my invention to provide simplified and improved means for insulating motor vehicle ground wheels from the supported vehicle frame and body structure whereby road shocks and vibrations are effectively dampened against transmission to the vehicle structure.

Another object is to improve the riding qualities of the vehicle by means providing limited movement in all directions of the wheel relative to the frame structure, preferably by the provision of cushioning means of a rugged character so disposed as to absorb the road shocks and vibrations closely adjacent the wheel and before the shocks act on the suspension system for the wheel.

My invention is especially adapted for use in connection with independently sprung ground wheels and embodies wheel supporting and guiding means including a supporting arm (steering knuckle support arm in the case of a steerable ground wheel) and a linkage structure.

The invention has for an object the provision of a relatively simple and inexpensive insulating connection between wheel guiding and supporting means as aforesaid which, while yieldably accommodating relative movement of the aforesaid means, will provide the desired degree of stability so that when employed in connection with a steerable ground wheel, for instance, the resulting influence on wheel camber is not harmful.

Further objects and advantages of my invention will be more apparent from the following detail description of one illustrative embodiment of my invention, reference being had to the accompanying drawing in which:

Fig. 1 is a front elevational view of a typical ground wheel suspension embodying the invention.

Fig. 2 is a fragmentary side elevational view, partly in section, taken as indicated by the line 2—2 of Fig. 1.

Fig. 3 is a fragmentary sectional view taken as indicated by the line 3—3 of Fig. 2.

Fig. 4 is a fragmentary side elevational view of a portion of the apparatus shown in Fig. 3 prior to assembly.

In the drawing I have illustrated my invention in connection with a steerable ground wheel A, it being understood that the opposite wheel is similarly suspended. The suspension system is, in general, a well known type embodying an upper linkage 10 and a lower linkage comprising the link members 11, these linkages being pivotally supported on the vehicle frame structure B at 12 and 13 respectively. These linkages extend laterally outwardly for pivotal connection at 14 and 15, respectively, with the upper and lower ends of the upright knuckle support arm C. The wheel supporting stub axle 16 is swively connected to the knuckle portion 17 of the arms by the usual king pin 18, as is more particularly shown in Fig. 3, for permitting steering of the wheel A. A coil spring 19 yieldably supports the frame structure B on the lower linkage, and a bumper 20 carried by the latter is engageable with an abutment 21 carried by the frame structure B to limit relative movement between the latter and the linkage.

The lower link members 11 are connected at their outer end portions with the lower end portion of the arm C as illustrated more particularly in Fig. 3. The aforesaid end portions of the link members are spaced apart to receive the arm C and are provided with registering openings threadedly receiving bushings 22. A connector pin or member 23 has annular portions threadedly engaging the inner surface of the bushings 22 and is adapted to be operatively connected with the arm C.

The arm C is provided with an indentation or groove 24 within which is disposed an intermediate portion of the connector 23, which is illustrated as rectangularly shaped in cross section, and in spaced relation to the walls of the groove 24. The means forming the connection between the parts 23 and C is more particularly shown in Fig. 4 and includes a body of deformably yieldable non-metallic material, indicated at 25, preferably of rubber or a material having the characteristics of the latter. The body 25 is substantially rectangularly shaped in cross section and has a correspondingly shaped opening 26 therein receiving aforesaid intermediate portion of the connector member 23. This shape of the parts facilitates the bonding operation by which the adjacent faces of the material 25 are adhered to the adjacent faces of the intermediate portion of the connector 23. Bonded to the respective outer side faces of the body 25 are plates 27 and 28, and when the parts are in assembled relationship, the plate 27 seats in a groove 29 formed in the bottom wall of the indentation or groove 24 and is thereby retained against movement vertically with respect to the arm C. A pin 30 press-fitted in an opening in the arm 17 extends into an opening in the plate 27 to further retain the latter against movement relative to the arm C and more particularly against movement in a horizontal plane. A plurality of fasteners 31 secure the plate 28 to the arm C.

As shown more particularly in Fig. 3, the material 25 is spaced from the upper and lower walls of the groove 24, a relatively thin portion of the material overlying the upper and lower edge portions of the connector 23 to cushion the contact of the latter with the walls and eliminate objectionable noise resulting from metal to metal contact.

During operation, when the road wheel A is displaced vertically carrying with it the arm C, the material of the body 25 is stressed in shear, the plates 27 and 28 being movable with the arm C, the space between the opposite walls of the arm C and the adjacent edges of the connector 23 permitting relative movement between the parts 23 and C through the action of the material 25. Thus the connector 23, in effecting a floating part, is subject to restraint by the material 25 acting in shear. When the arm C is displaced laterally relative to the connector 23, due to displacement of the wheel A for instance, the material 25 is subjected to a compressive force.

While the connection accommodates limited relative lateral movement between the parts C and 23, it nevertheless provides the desired degree of lateral stability, and provision of the latter does not result in harmful effects on wheel camber, as a relatively thin layer of rubber is compressed during lateral movement.

As a further feature of the invention metallic means is provided for limiting movement of the floating part, the connector 23, in any direction. As previously pointed out, the oppositely disposed walls of the indentation 24 limit lateral movement of the connector. The latter is provided with axially spaced shoulder portions 32 which, in case of failure of the material 25, would engage the adjacent edges of the plate 28 and arm C from which they are normally spaced, to limit axial movement. A rubber washer 33 is disposed between each shoulder 32 and the adjacent surfaces of the member 11 and bushing 22.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a suspension for a motor vehicle ground wheel, wheel supporting and guiding means comprising an upright wheel support arm and a pair of link members for swingingly supporting said arm on the vehicle frame to accommodate rising and falling of the wheel independently of the remaining wheels of the vehicle, a connector extending between and secured to said link members, a pair of plates secured to said arm, in spaced relation to said connector, and a body of deformable non-metallic material bonded to said plates and to said connector yieldably maintaining said connector and said arm spaced from each other while serving to connect them together for limited universal movement relative to each other.

2. In a suspension for a motor vehicle ground wheel, wheel supporting and guiding means including an upright arm and link means swingingly supporting said arm on the vehicle frame to accommodate rising and falling of the wheel independently of the remaining wheels of the vehicle, a connector for said arm and link means, and means for securing said connector to said arm for accommodating relative movement therebetween, said securing means including a pair of spaced plate members retained against movement relative to said arm, and a body of rubber-like material including spaced substantially flat upright layers interposed between said connector and a respective plate and bonded thereto, said connector being spaced from said arm and adapted for engagement therewith in the event of failure of said securing means.

3. In a suspension for a motor vehicle ground wheel, an upright wheel support member having an indentation therein, upper and lower guide means swingably connecting said member to the vehicle frame structure, at least one of said guide means including link members having spaced outer end portions, a connector having end portions rotatably secured to the outer end portions of said link members, respectively, and an intermediate portion extending into said indentation, a body of yieldable non-metallic material bonded to opposite faces of said intermediate portion, a pair of plate-like members bonded to non-adjacent faces of said material, one of said plates abutting a wall defining at least a portion of said indentation, means for maintaining said last mentioned plate against movement in at least one direction relative to said wall, and means engaging the other of said plates for mechanically securing the latter to said support member.

4. In a suspension for a motor vehicle ground wheel, an upright wheel support member having an indentation therein, upper and lower linkages swingably connecting said member to the vehicle frame structure, at least one of said linkages including link members having spaced outer end portions, a connector having end portions rotatably secured to the outer end portions of said link members, respectively, and an intermediate portion extending into said indentation, a body of yieldable non-metallic material bonded to opposite faces of said intermediate portion, a pair of plate-like members bonded to non-adjacent faces of said material, one of said plates abutting a wall defining at least a portion of said indentation, means for maintaining said last mentioned plate against movement in at least one direction relative to said wall, and means engaging the other of said plates for mechanically securing the latter to said support member, said yieldable material and said intermediate portion of said connector being spaced from oppositely disposed wall portions of said indentation.

5. In a suspension for a motor vehicle ground wheel, an upright support arm, upper and lower link means for swingably connecting said arm to the vehicle frame structure, at least one of said link means including a pair of link members, means forming an operating connection between adjacently disposed end portions of said link members and said arm, said means including a connector having end portions secured to said link members respectively and an intermediate portion having oppositely disposed substantially flat face portions, a pair of upright plate-like members spaced from said connector and mechanically fixed to said arm, and a body of yieldable non-metallic material maintaining said connector and said arm spaced from each other in all directions while serving to connect them together for limited movement therebetween, said material having substantially flat upright face portions abutting and bonded to the flat face portions respectively of said connector and having other face portions abutting and bonded to said plates respectively.

6. In a suspension for a motor vehicle ground wheel, an upright wheel support arm having an indentation therein, upper and lower guide means for swingably supporting said arm on the vehicle frame to accommodate rising and falling movement of the wheel independently of the remaining wheels of the vehicle, a connector operatively secured to one of said guide means and having a substantially flat upright portion disposed in said indentation, a pair of plate members fixed against movement relative to said arm, and a substantially flat upright body of deformable non-metallic material yieldably connecting said arm and said connector, said material being bonded to said upright portion and to said plates, vertically spaced wall poritons of said indentation being normally spaced from said connector and engageable therewith in the event of failure of said connecting means.

7. In a suspension for a motor vehicle ground wheel, an upright wheel support arm having an indentation therein, upper and lower linkages for swingably connecting said arm to the frame structure, and means adapted to operably connect said lower linkage and said arm, said means including a unitary assembly adapted to extend into said indentation and compirsing a connector securable to said lower linkage and having a substantially flat upright intermediate portion, a pair of spaced upright plates adapted to be mechanically secured to said arm and a body of rubber-like material extending between said connector and each of said plates and bonded to said connector intermediate portion and each of said plates.

8. In a suspension for a motor vehicle ground wheel, wheel supporting and guiding means including an upright wheel support arm and link means for swingably supporting said arm from the vehicle frame to accommodate rising and falling movement of the wheel independently of the remaining wheels of the vehicle, a connector operatively secured to said link means and having a portion thereof spaced from said arm, and a substantially flat upright body of rubber-like material operatively connecting said arm and said spaced connector portion to yieldingly accommodate limited universal relative movement therebetween, said material being so connected with said arm and said connector as to be stressed in shear acting in the direction of the upright length of said body in accommodating said relative movement vertically.

9. In a suspension for a motor vehicle ground wheel, an upright support arm, upper and lower linkages for swingably supporting said arm from the vehicle frame structure to accommodate rising and falling movement of said wheel independently of the remaining ground wheels, a connector mechanically secured to said lower linkage and having a portion thereof provided with substantially flat upright faces spaced from said arm, and means yieldably connecting said connector with said arm accommodating limited universal movement of said wheel relative to said lower linkage, said yielding means including a substantially flat upright body of rubber-like material operatively connecting said connector face portions and said arm, said material being so connected with said arm and said connector as to be stressed in shear acting in the direction of the upright length of said body during rising and falling movement of said wheel and to compressive stress in resisting lateral movement of said wheel relative to the frame structure.

CLIFFORD C. JACKSON.